United States Patent [19]

Jagadish

[11] Patent Number: 5,365,430
[45] Date of Patent: Nov. 15, 1994

[54] METHOD FOR PARSING IMAGES

[75] Inventor: Hosagrahar V. Jagadish, Berkeley Heights, N.J.

[73] Assignee: AT&T Bell Laboratories, Murray Hill, N.J.

[21] Appl. No.: 720,318

[22] Filed: Jun. 25, 1991

[51] Int. Cl.$^5$ .............................................. G06F 15/38
[52] U.S. Cl. ................................................ 364/419.08
[58] Field of Search ........................... 364/419, 419.08

[56] References Cited

U.S. PATENT DOCUMENTS

| | | | |
|---|---|---|---|
| 4,688,195 | 8/1987 | Thompson et al. | 364/419 |
| 4,984,178 | 1/1991 | Hemphill et al. | 364/419 |

OTHER PUBLICATIONS

Tsujimoto et al.; "Understanding Multi-articled documents"; 16–21 Jun. 1990; pp. 551–556.
Chou; "Recognition of Equations Using a Two-Dimensional Stochastic Context Free Grammar"; Nov. 1989, pp. 852–863 vol. 1199.
Okada; "A Unification Grammar-directed One-Pass Search Algorithm for Parsing Spoken Language"; pp. 721–724; May 1991.
N. K. Simpkins et al. "Chart Parsing in Podog"; vol. 8, No. 2, 1990 Tokyo JP pp. 113–138.

Primary Examiner—Roy N. Envall, Jr.
Assistant Examiner—Xuong Chung
Attorney, Agent, or Firm—Henry T. Brendzel

[57] ABSTRACT

Parsing of partially orderable sets of symbols is achieved by first forming a total order of the given terminal symbols. The relationships between the terminal symbols are formulated, and the given grammar is broken up into a set of production rules. Based on the production rules, a determination is made as to what kind of symbol is needed to comply with the given grammar. This determination encompasses both the type of terminal symbol that is to be found as well as the partial order relationships that such a symbol must have. The set of totally ordered symbols are searched, in order, and the first symbol that meets the specified criteria is selected. When appropriate, the symbols retrieved from the totally ordered set are reduced to nonterminal symbols, with the ultimate goal being the inclusion of all of the symbols in the totally ordered set within one reduced non-terminal symbol.

6 Claims, 4 Drawing Sheets

FIG. 2

January 1984  
Volume 31 Number 1

A publication of the  
Association for  
Computing Machinery

Journal of the Association for Computing Machinery

*Heading*

*Body*

| | | | |
|---|---|---|---|
| ARTIFICAL INTELLIGENCE | 1 | Deciding Combinations of Theories<br>by Robert E. Shostak | *Category* |

| | | |
|---|---|---|
| CIRCUIT DESIGN | 13 | Bounding Fan-out in Logic Networks<br>by H.J. Hover, M.M. Klawe, and N.J. Pippenger |
| COMBINATORICS AND GRAPH THEORY | 19 | Some Hamilton Paths and a Migimal Change Aloorithm<br>by Peter Eades, Michael Hickey, and Ronald C. Read |
| DATABASE THEORY | 30 | On the Structure of Armstrong Relations for Functional Dependences<br>by Catriel Berri, Ronald Fagin, and Richard Statman |
| | 47 | On Compiling Queries in Recursive First-Order Databases<br>by Lawrence J. Henshen and Shamim A. Naqvi |
| OPERATING SYSTEMS | 86 | Optimal Flow Control of an M/M/m Queue<br>by Aurel A. Lazar |
| OPERATIONS RESEARCH | 99 | A Fast Algorithm for the Two-Variable integer Programming Problem<br>by Sidnie Dresher Feit |
| | 114 | Linear Programing in Linear Time When the Dimension is Fixed<br>by Nimrod Megiddo |
| SYSTEMS MODELING AND ANALYSIS | 128 | The Product Form for Sojourn Time Distributions in Cystic Expoential Queues<br>by O.J. Boxma, F.P. Kelly, and A.G. Konheim |
| | 134 | Priority Queues with Feedback<br>by B. Simon |

*Category*

| | | |
|---|---|---|
| THEORY OF COMPUTING | 150 | Information Transfer in Distributed Computing with Applications to VLSI<br>by J. Ja' Ja' and V.K. Prasanna Kumar |

*Group Heading*

163 Random Trees and the Analysis of Branch and Bound Procedures  
  by Douglas R. Smith

*Page Number*  *Writer*  *Title*

*Article Category*

*Body*

METHOD FOR PARSING IMAGES

BACKGROUND OF THE INVENTION

Currently, one of the common means for interfacing with a small computer such as a PC comprises a screen, a keyboard, and a pointing device (e.g., a mouse). The pointing device arrangement includes an icon that is presented on the screen, a moveable "mouse" connected to the computer, software for moving the icon in response to the movement of the "mouse" and software for recognizing the position of the icon.

The icon mouse arrangement is very effective for obtaining information from the user when the amount of information that is needed is small, such as when computer commands are, effectively, selected. At such a command selection session, the computer presents various options to the user and the user selects from among the presented options.

The schema for presenting the options and for identifying the selection made by the user, via the icon mouse interface, involves creating an image on the screen where specified areas on the screen correspond to specific selections, identifying the position of the icon on the screen, and establishing a correspondence between the icon position, the established screen areas, and the effective command selection.

Typically there is no logical relationship between one area of a screen and another area of the screen. That is, no action that is associated with one area is taken simply because the icon is in some proximal relationship to that area. The question is not asked whether the icon is to the right, left, above, or below area, but only whether the icon is in the area. That is not to say that logical relationships cannot exist between areas, and in some applications they do. However, the programs that recognize and implement the controls associated with such logical relationships are "tailor made" for the specific applications.

Aside from the "control" aspect of the interaction between the computer and the user, there are other situations where different areas of a display screen share a logical relationship. For example, when an image of a business letter (of a known format) is formed on the screen, it is known where the date of the letter can be found, where the addressee can be found in relation to the date, where the salutation can be found in relation to the addressee, etc. The same applies to many database output "screens", which often are presented in tabular form.

The question is: how to program the computer to recognize and analyze these logical relationships, and how to approach the programming task in a logically robust way. A careful study of this question reveals that it basically is a grammar problem. That is, the problem involves the question of what is the best way to parse the image and what is the best way to make sense of the parsed information.

Parsing of information and deriving contextual information as a result of the parsing has been studied extensively in connection with formal languages. Such languages comprise a collection of symbols and a set of rule-defined manipulations of the symbols (grammar). The set of symbols includes both terminal symbols, which are the elemental units in the language (such as words) and non-terminal symbols which are constructed from terminal symbols (such as phrases). The symbol manipulation rules are sometimes termed the production rules, and those define valid mappings of symbols. For example, the production rule $$A \rightarrow bcN \qquad (1)$$

states that when the sequence of symbols bcN is found in the input, that sequence may be replaced with the symbol A. (In this disclosure, lower case letters designate terminal symbols and upper letters designate non-terminal symbols.) Obviously, the notion of "next" and "previous" is very important to the production rules, and that imposes a strict concept of sequencing on the symbols in any candidate "sentence" of the language. The ordering of symbols is clearly definable in one dimensional strings (which natural languages are). In higher order strings, however, the concept of a sequential order is not well defined. That is the reason why parsing of multi-dimensional strings has not progressed very far.

SUMMARY OF THE INVENTION

Parsing of partially ordered sets of symbols is achieved by first forming a total order of the given terminal symbols. The relationships between the terminal symbols are formulated, and the given grammar is broken up into a set of production rules. Based on the production rules a determination is made as to what kind of symbol is needed to comply with the given grammar, which determination encompasses both the type of terminal symbol that is to be found as well as the partial order relationships that such a symbol must have. The set of totally ordered symbols are searched, in order, and the first symbol that meets the specified criteria is selected. When appropriate, the symbols retrieved from the totally ordered set are reduced to non-terminal symbols, with the ultimate goal being the inclusion of all of the symbols in the totally ordered set within one reduced non-terminal symbol.

BRIEF DESCRIPTION OF THE DRAWING

FIG. 2 presents a pictorial view of a title page in an ACM journal;

DETAILED DESCRIPTION

Ordering and Guiding

Figure 1:
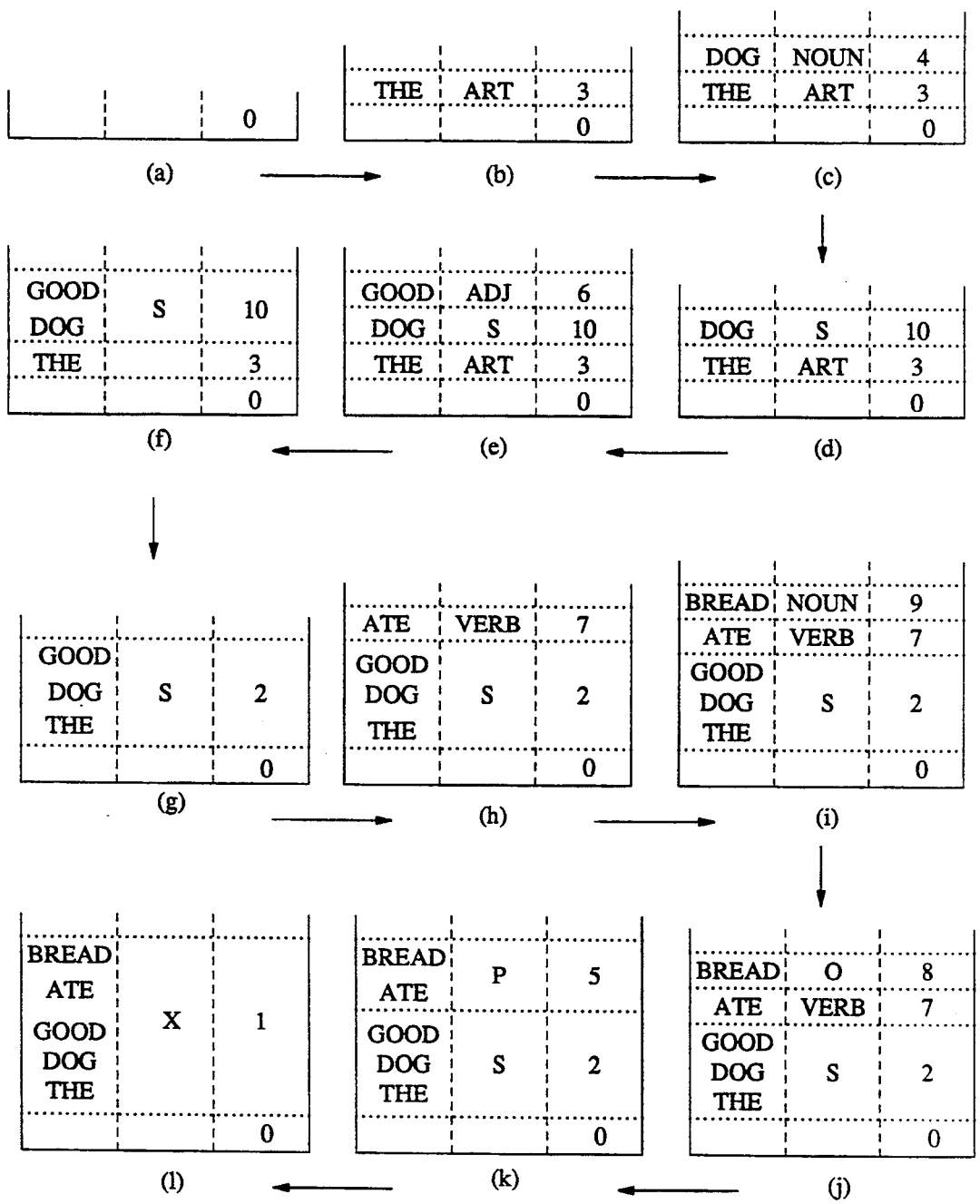
FIG. 1 (shown in steps A-L) illustrates the contents of a stack in a finite state machine as it parses a given sentence.

It may be surmised from the above that before the parsing of multi-dimensional strings can take place, a reasonable ordering schema must be developed for such strings, and a parsing process must be created that couples well to such an ordering schema.

Disclosed herein is an efficient parsing process which operates effectively in any environment where the set of symbols can be partially ordered in the multi-dimensional space (having $\alpha$ dimensions or senses). A partially ordered set is a set of elements where a relation may exist between any two elements, but when it exists, it possesses the transitive property (if $a<b$ and $b<c$ then $a<c$). In a totally ordered set there is some relationship between the elements and the transitive property holds.

Given a set of symbols that are partially ordered, what is necessary for the practice of this invention is a total ordering of the symbols. Any ordering schema will do, but the following presents a reasonable ordering methodology that works for a wide variety of the symbols sources interest.

A partially ordered set of symbols is totally ordered, according to this methodology, only if in the given set of symbols, every symbol, u, is less than or greater than the symbol v (where "less than" may mean "precedes") in at least one dimension or sense. The relation "v is less than, or precedes, v in the 1 dimension sense" is written as $$v \underset{1}{<} u.$$

When it is not known whether v is less than u or vise-versa in the 1 dimension sense, the expression $$v \underset{1}{=} u$$

is used. Describing the total ordering methodology in the more concise mathematical terms, for any pair of symbols, u and v, (2)

if $u \underset{1}{<} u$ then $u < v$ if $v \underset{1}{<} v$ then $v < u$ if $u \underset{1}{=} v$ then:

if $u \underset{2}{<} v$ then $u < v$ if $u \underset{2}{<} u$ then $v < u$ if $u \underset{2}{=} v$ then:

.
  .
  .

if $u \underset{\alpha}{<} v$ then $u < v$ if $v \underset{\alpha}{<} u$ then $v < u$ if $u \underset{\alpha}{=} v$ error. Possible only if $u = v$ The above ordering establishes a methodology for unambiguous total ordering of the input symbols.

In addition to the partial ordering of the input, the parsing process of this invention employs the concept of "guiding". A symbol "u" is said to be "i-guiding" the symbol "v" if and only if the following conditions are met:

i.

ii.
$$u \underset{i}{<} v,$$

$$u \underset{j}{=} v \quad \forall \; j \neq i$$

iii there exists no w such that $$u \underset{1}{<} w \underset{1}{<} v.$$

That is, "u 1-guides v" if u is less than v in dimension 1 sense, there is no w between u and v in that dimension, and u and v are incomparable in all dimensions j other than i.

A parsing process that employs the above-defined ordering and guiding principles is formulated below. The description of this parsing process is aided with a simple example of a contrived two-dimensional "first cousin" of the English language, but first a grammar for that language must be defined.

Grammar of the Two-Dimensional English Language

To make sense of ordered words—i.e., to parse the input—rules of grammar must be presented. For purposes of this disclosure, the contrived two-dimensional language follows the following grammar where the symbols of the language are italicized:

| Rule | Meaning |
|---|---|
| 1. *FIN* → *X* | symbol *X* maps to symbol *FIN* which designates a successful finish of the parsing process; |
| 2. *X* → *S* $\underset{1}{<}$ *P* | a subject clause *S* to the left of a predicate clause, *P*, maps to *X*; |
| 3. *S* → *art* $\underset{1}{<}$ *S* | an article to the left of *S* maps to *S*; |
| 4. *S* → *S* $\underset{2}{<}$ *adj* | an *S* above an adjective maps to *S*; |
| 5. *P* → *verb* $\underset{2}{<}$ *O* | a *verb* above an object clause, *O*, maps to *P*; |
| 6. *O* → *noun* | a *noun* maps to *O*; and |
| 7. *S* → *noun* | a *noun* maps to *S*. |

Finite State Machine States

As will be described more fully below, the parsing process of this invention may be carried out with a finite state machine (FSM), which is characterized by discrete states. The FSM enters a given state when a specified input is given, performs certain operations that are predefined for that state and stays there until another input is given. The states of the FSM parser of this invention can be developed from the above grammar.

Specifically, from rule 1 of the grammar we get state 0

FIN→*X.

The * to the left of X means that X is sought to be "observed". From rule 2 of the grammar, seeking to observe X is also seeking to observe S, as in the transformation, or item

X→*S P, and from rules 3, 4 and 7, seeking to observe S is also seeking to observe art, S, or noun, to wit:

S→*art S
S→*S adj
S→*art noun.

Thus, state 0 corresponds to:

FIN→*X
X→*S P
S→*art S
S→*S adj
S→* noun.

When X is observed, the FSM moves from state 0 to state 1; when S is observed, the FSM moves to state 2; when art is observed, the FSM moves to state 3; and when noun is observed, the FSM moves to state 4. Expanding each of the states, the entire set of states and items in those states is developed, as shown in the following listing.

| state 0: | FIN→ *X | (seek first) |
|---|---|---|
|  | X→ *S P |  |
|  | S→ *art S |  |
|  | S→ *S adj |  |
|  | S→ *noun |  |
| state 1: | FIN→X * | R |
| state 2: | X→S *P | (S,1) |
|  | S→S *adj | (S,2) |
|  | P→ * verb O |  |
| state 3: | S→art *S | (art,1) |
|  | S→ *art S |  |
|  | S→ *S adj |  |
|  | S→ *noun |  |
| state 4: | S→noun * | R |
| state 5: | X→S P * | R |
| state 6: | S→S adj * | R |
| state 7: | P→verb *O | (verb,2) |
|  | O→ * noun |  |
| state 8: | P→verb O * | R |
| state 9: | O→noun * | R |
| state 10: | S→art S * | R |
|  | S→S * adj | (s,2) |

In the above listing, the R designation next to some items indicates that those are reducible. Those are "reduce items". A "kernel item" is an item that is not reducible and there is at least one symbol to the left of the * on its right hand side. The guidance relationship of the kernel items is important, so it is included in the parenthetical expression to the right of the kernel item. The item FIN→* X is a pseudo kernel item. It specifies a seek of the first item in the ordered list of elements.

FSM states that include a kernel item are states that require new information. In response to that information, in some instances the FSM enters a state where a reduction takes place, and in other instances the FSM enters a state where more information is needed (sometimes termed a "shift"). The reduction items and the kernel item, i.e., the items in the above list that have a parenthetical comment to the right, are the "decision items".

An FSM state may exist where a shift/reduction conflict is present. State 10 above has such a conflict, where it is not specified which action to perform. Normally, the conflict between reduce and shift is resolved in favor of the shift. The rationale for this is based on the objective, which is to find the largest grouping of symbols that can be reduced. It may be noted that state 2 has two kernel items, representing a seek, or shift conflict. According to the first item, the FSM must seek something that is 1-guided by S, while according to the second item the FSM must seek something that is 2-guided by S. This seek conflict really means that the grammar is not well defined. However, that may be resolved by either creating an additional rule or by the user simply selecting a preference. In the case at hand, the second item transforms an observed S into another S. It makes sense in this case, therefore, to promulgate the rule that such transformations take precedence over the transformation of the first item. Thus, the order of operations in state 2 shall be to seek symbols in the ordered input list in accordance with the second item, and if none are found to seek symbols in the ordered input list in accordance with the first item.

The rules set for the conflicts of state 2 can be addressed also in the more conventional manner of adding additional non-terminal symbols and additional statements to the grammar that would eliminate the conflicts and impose the particular desired seek/reduce parsing order.

Table 1 presents the state transition matrix for the states identified above. It may be noted that some states of the finite state machine do not appear as lines in the transition matrix of Table 1. These are states that correspond to a single reduction item.

TABLE 1

| state/input | X | S | art | noun | P | adj | verb | O |
|---|---|---|---|---|---|---|---|---|
| 0 | 1 | 2 | 3 | 4 |  |  |  |  |
| 2 |  |  |  |  | 5 | 6 | 7 |  |
| 3 |  | 10 | 3 | 4 |  |  |  |  |
| 7 |  |  |  | 9 |  |  |  | 8 |
| 10 |  |  |  |  |  | 6 |  |  |

Sample Sentence to be Parsed

Given a sentence which states:

$$\text{The} \quad \text{dog} \quad \text{ate} \quad\quad (3)$$
$$\text{good} \quad \text{bread}$$

the first step is to order the input symbols (words). Taking the five words of the sentence in pairwise combinations and applying the ordering schema described above, the following results:

$$(4)$$

The <dog
1

The <good
1

The <good
2

The <bread
2 dog <ate
1

$$dog <bread \atop 1$$

$$dog <good \atop 2$$

$$dog <bread \atop 2$$

$$good <ate \atop 1$$

$$good <bread \atop 1$$

$$ate <good \atop 2$$

$$ate <bread \atop 2$$

It may be noted that some combinations were not taken, because either there is no information about the relation, or because the relation can be developed from the transitive property of the "21" operator.

In the above listing of pairwise combinations, the term "The" is clearly the lead symbol. It precedes every other symbol in both dimensions. Initiating the ordering procedure, the symbols that are related to symbol "The" in dimension 1 sense are "good" and "dog". It is known that they succeed the symbol "The" but their order relation to each other is not known. When "good" and "dog" are ordered, it is noted that they are incomparable in dimension 1 sense. However, in dimension 2 sense "dog" is above "good" and, therefore, in accordance with the partial ordering rules above, they line up behind the symbol "The" as follows:

The <dog <good.

The two remaining words, "ate" and "bread", succeed "dog" and "good" in dimension 1 sense but, between them, a dimension 2 sense ordering must again be established. Applying the procedure designated by (2), the final order obtained for the entire sentence of (3) is The <dog <good <ate <bread. (5)

The string (4) may not have the structure of a valid sentence in the English language, but that is completely unimportant. What is important is that a clear unambiguous order has been established. The input words are accessed in that order in the course of this invention's parsing process, as described more fully below.

With respect to the "guiding" relations, applying the relations list (4) to the sentence designated by (3), results in the following "The" 1-guides "dog" (6)

"dog" 1-guides "ate"

"good" 1-guides "bread"

"dog" 2-guides "good"

"ate" 2-guides "bread"

This is the "guiding list", which is augmented in the course of the parsing process as described below. The relation list (4) is also augmented in the course of the parsing process, and is described below.

Augmenting the Relations List and the Guiding List

The grammar must specify a rule according to which partial order relationships can be determined between non-terminal symbols that are newly created in the parsing process and other symbols that already exist. The rule is that a relationship exists between a non-terminal and another symbol if and only if the relationship exists between each of the constituents of the said non-terminal and the said other symbol. When a reduction is applied to create a new non-terminal symbol, this rule is used to augment the relations list. Thereafter, all occurrences in the relations list of symbols constituent in the new non-terminal are deleted.

The changes made to the relations list must also be reflected in the guiding list. Any guiding relationship with respect to constituent symbols of the new non-terminal are no longer required, and should be deleted. New guiding relationships with respect to the new non-terminal symbol, if any, are determined in the usual way, and these are added to the guiding list.

The parsing process

The parsing procedure starts with state 0 in the stack, as depicted in step a of FIG. 1. There are no conditions imposed on what is to be retrieved from ordered list (5) and, therefore, the first symbol ("The", which is an art) is retrieved. Since, according to table 1, art is an acceptable input, the tuple "The:art:3" is stored in the stack and the FSM moves to state 3, as specified by table 1 and shown in step b of FIG. 1. Having observed and accepted the symbol "The", it is deleted from ordered list (5).

In state 3, there is one kernel item. It directs a seek of something that is 1-guided by art. The art that is in the stack is "The". Going over to the guiding list above, the first entry that "The" 1-guides is "dog" (first item in the list), which is a noun. According to table 1, noun is an acceptable input at state 3, directing the FSM to state 4. Hence, the tuple "dog:noun:4" is pushed onto the stack, as shown in step c of FIG. 1, and the symbol "dog" is deleted from the ordered list.

State 4 reduces a noun to S. Accordingly, the tuple "dog:noun:4" is popped from the stack and the noun is replaced with S. Concurrently, the relations list is augmented with the entries $$The <S[dog] \atop 1$$

$$S[dog] <ate \atop 1$$

$$S[dog] <bread \atop 1$$

$$S[dog] <good \atop 2$$

$$S[dog] <bread \atop 2$$

and the "guiding list" is augmented with the entries
   S[dog]1-guides "ate"
   S[dog]2-guides "good".

Replacement of the noun with S, in effect, provides an input S to the FSM while it is in state 3. According to table 1, when in state 3 and S is observed, the FSM moves to state 10. Hence, the popped tuple is changed to "dog:S:10" and pushed onto the stack as shown in step d of FIG. 1.

In state 10, the FSM proceeds to seek something that is 2-guided by S. There is only one such entry in the guiding list (S[dog]2-guides "good") and "good", being an adj,, meets the requirement of the seek item S→*adj. Hence, "good" is taken from the ordered list, the tuple "good:adj:6" is created (with reference to table 1) and pushed onto the stack as shown in step e of FIG. 1. As with the other accepted symbols, "good" is deleted from the ordered list.

State 6 is a reduce state. The two tuples in the stack are popped, and the reduction is performed, yielding S. Again the FSM is cognizant of state 3 and the input symbol is S. According to table 1, the next state is 10 and, therefore, the new tuple "good, dog:S:10" is created and pushed into the stack, as shown in step f of FIG. 1. The relations list is again augmented, with the entries $$The <S[dog, good] \atop 1$$

$$S[dog, good] <ate \atop 1$$

$$S[dog, good] <bread \atop 1$$

and the guiding list is augmented with the entries
   S[dog,good]1-guides "ate"
   S[dog,good]1-guides "bread".

Being back in state 10, once again an attempt is made to shift in an adj that is 2-guided by S. This attempt fails, however; therefore, the next decision items is applied, which is the reduce item S→artS *. That yields S once again, which is pushed back onto the stack after popping the top two tuples. The FSM is cognizant of state 0 and it observes an S so, according to table t the FSM advances to state 2, as shown in step of FIG. 1. Once again the relations list is augmented, this time with entries $$S[The, dog, good] <ate \atop 1$$

$$S[The, dog, good] <bread \atop 1$$

and the guiding list is augmented with the entries
   S[The,dog,good]1-guides "ate".
   S[The,dog,good]1-guides "bread"

In state 2 there are two different seeks that are possible. As discussed earlier, it is preferred to seek something that is 2-guided by S. Not finding anything, a seek is made for something that is 1-guided by S (per item S→S*P). The first symbol in the remaining list "ate<bread" that is 1-guided by S (or, more specifically, S[The,dog,good]) "ate"). That is a verb, and according to table 1, a verb is an acceptable symbol which drives the FSM to state 7. The tuple "ate:verb:7" is created and pushed onto the stack as shown in step h of FIG. 1.

State 7 includes a kernel item which directs a seek of something that is 2-guided by verb. According to the "guiding list", the symbol "ate", which is a verb, 2-guides the symbol "bread", the symbol "bread" is found in the ordered list (indeed, it is the last and only symbol left in the ordered list). Also, the symbol "bread" is a noun, which table 1 states that it is an acceptable symbol. Consequently, the tuple "bread:noun:9" is created and pushed onto the stack as shown in step i of FIG. 1.

State 9 is a reduce state. The top tuple is popped, the noun is reduced to O, the tuple "bread:O:8" is created pursuant to table 1, and pushed onto the stack as shown in step j of FIG. 1.

State 8 is also a reduce state. The two top tuples are popped, the reduction P→verb O* is performed, the new tuple "bread, ate:P:5" is created with the aid of table 1 and is pushed onto the stack, as shown in step k of FIG. 1.

State 5 is also a reduce state. Again, the two top tuples are popped, the reduction X→S P* is performed, the new tuple "bread, ate,good, dog,The:X:1" is created with the aid of table 1 and is pushed onto the stack, as shown in step 1 FIG. 1.

The relations list and the guiding list are, of course, updated after each of the above reductions. Since nothing that is different or interesting happens in these updates, they are not shown for sake of brevity.

Finally, in state 1, the transformation FIN→X* is performed, bringing the parse to a successful end. One of the conclusions of the parse is that the sentence of (3) is a valid sentence according to the given grammar.

Parsing an image

The above example of a contrived two-dimensional language was presented as a vehicle for introducing the concepts associated with the parsing process of this invention. The following presents a practical use for the parsing process and apparatus of this invention. In particular, FIG. 2 presents a pictorial representation of the title page of the Journal of the Association of Computing Machinery. It includes blocks of text, and each block of text has a meaning that's contained in the words within the block and an additional meaning that's embedded in the position of the block of text in relation to the position of other blocks of text. It would be beneficial if electronic scanning and signal processing of FIG. 2 could uncover both the text that's embedded in the scanned image and its meaning. For example, the string of letters making up the word "Hover" is found in the FIG. 2 image. Aside from ascertaining that this word is in the image, it may be determined that this word is the name of an author rather then, perhaps, a word in the title of an article pertaining to hovering vehicles. Being able to assign a category to scanned image elements goes a long way toward a more effective interaction with computer-based systems.

A perusal of FIG. 2 reveals that it contains structural blocks (comprising text), or elements such as a Heading, a Body, a Category, a Group Heading, an Article, a Page Number, a Writer, and a Title. It may be noted that all of the above elements have initial caps, to designate (as before) that these are non-terminal elements. The terminal elements, which are the basic scanned elements are line blocks, such as the upper case and lower case collection of letters making up the title; caps blocks, such as the collection of all capital letters making up a Group Heading; and number blocks, such as the page numbers. It may also be noted that some of the non-terminal elements can be subdivided into other non-terminal elements, but for sake of brevity that was not done in the FIG. 2 image. The Heading block, which can be divided into three basic sub-blocks, is a notable example of that and, henceforth, the element Heading is assumed to be a terminal element (heading).

A study of the structure present in the FIG. 2 image reveals that the following grammar is embedded in that structure.

$S \rightarrow$ heading Body    (heading $<$Body$)$
$\qquad\qquad\qquad\qquad\qquad\quad 2$ Body $\rightarrow$ Category Body    (Category $<$Body$)$
$\qquad\qquad\qquad\qquad\qquad\qquad 2$ Body $\rightarrow$ Category Category $\rightarrow$ GroupHead Article    (GroupHead $<$Article$)$
$\qquad\qquad\qquad\qquad\qquad\qquad\qquad 1$ Category $\rightarrow$ Category Article    (Category $<$Article$)$
$\qquad\qquad\qquad\qquad\qquad\qquad 2$ Article $\rightarrow$ PageNum Title Writer    (PageNum $<$Title,
$\qquad\qquad\qquad\qquad\qquad\qquad\qquad 1$ PageNum $<$Writer, PageNum $<$Writer, PageNum $<$Writer)
$\qquad 1 \qquad\qquad\qquad\qquad 2 \qquad\qquad\qquad\qquad 2$ PageNum $\rightarrow$ numberblock Title $\rightarrow$ lineblock Writer $\rightarrow$ lineblock GroupHead $\rightarrow$ capsblock Deriving states for a finite state machine that is based on the above grammar results

| | | |
|---|---|---|
| state 0: | FIN$\rightarrow$ *S | (seek first) |
| | S$\rightarrow$ *hB | |
| state 1: | FIN$\rightarrow$S * | R |
| state 2: | S$\rightarrow$h *B | (h,2) |
| | B$\rightarrow$ *C | |
| | B$\rightarrow$ *CB | |
| | C$\rightarrow$ *CA | |
| | C$\rightarrow$ *GA | |
| | G$\rightarrow$ *c | |
| state 3: | S$\rightarrow$hB * | R |
| state 4: | B$\rightarrow$C * | R |
| | B$\rightarrow$C *B | (C,2) |
| | C$\rightarrow$C *A | (C,2) |
| | B$\rightarrow$ *C | |
| | B$\rightarrow$ *CB | |
| | C$\rightarrow$ *CA | |
| | C$\rightarrow$ *GA | |
| | G$\rightarrow$ *c | |
| | A$\rightarrow$ *PTW | |
| | P$\rightarrow$ *n | |
| state 5: | C$\rightarrow$G *A | (G,1) |
| | A$\rightarrow$ *PTW | |
| | P$\rightarrow$ *n | |
| state 6: | G$\rightarrow$c * | R |
| state 7: | B$\rightarrow$CB * | R |
| state 8: | C$\rightarrow$CA * | R |
| state 9: | C$\rightarrow$GA * | R |
| state 10: | A$\rightarrow$P *TW | (P,1) |
| | T$\rightarrow$ *l | |
| state 11: | P$\rightarrow$n * | R |
| state 12: | A$\rightarrow$PT *W | (T,2) |
| | W$\rightarrow$ *l | |
| state 13: | T$\rightarrow$l * | R |
| state 14: | A$\rightarrow$PTW * | R |
| state 15 | W$\rightarrow$l * | R |

It may be noted that state 4 above is the most complex state. It includes a reducible item (B$\rightarrow$c*) and two kernel items (B$\rightarrow$C*b and c$\rightarrow$C*A). The shift-reduce conflict is resolved in favor of the shift. The two different kernel items do not represent a seek conflict because both look for something that is 2-guided by C. The state transition matrix is shown in Table 2 below. States in which no input is accepted (i.e., states with no kernel items) are not shown in the matrix because the rows corresponding to those states would be all blank.

TABLE 2

| state/input | c | h | l | n | A | B | C | G | P | S | T | W |
|---|---|---|---|---|---|---|---|---|---|---|---|---|
| 0 | | 2 | | | | | | | | 1 | | |
| 2 | 6 | | | | | 3 | 4 | 5 | | | | |
| 4 | 6 | | | | 11 | 8 | 7 | 4 | 5 | | 10 | |
| 5 | | | | | 11 | | 9 | | | | 10 | |
| 10 | | | 13 | | | | | | | | | 12 |
| 12 | | | 15 | | | | | | | | | 14 |

The Parsing Apparatus and Process Flow

Figure 3:
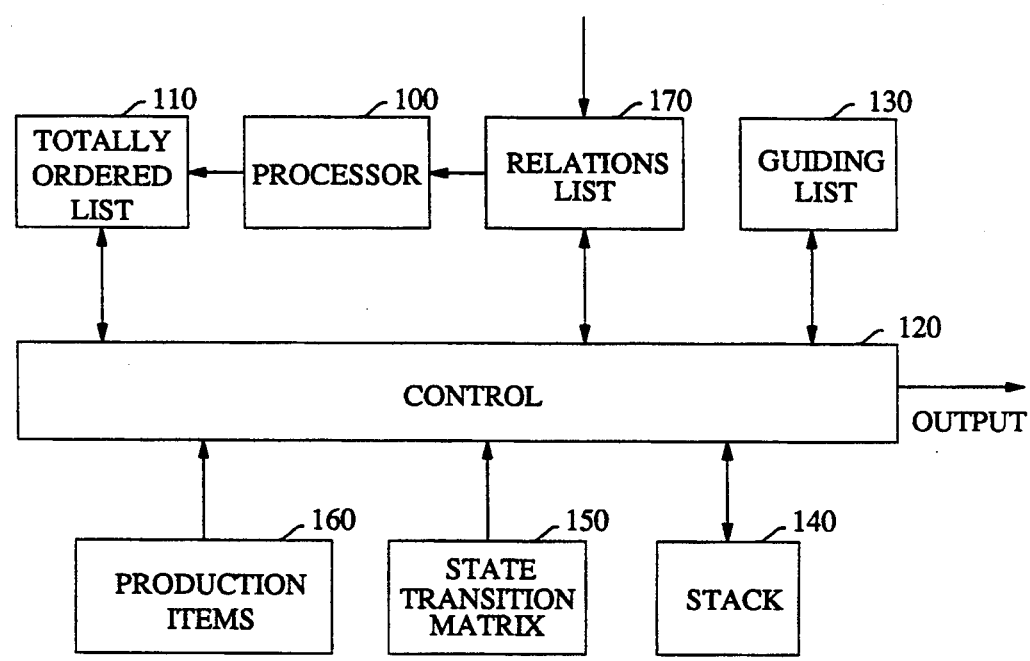
FIG. 3 is a block diagram of a parser in accordance with the principles of this invention.

FIG. 3 depicts a block diagram of the parsing apparatus embodying the principles of this invention. The scanned input symbols are inserted into block 170 wherein a relations list is formed based on the partial order relationships of the input elements. From the block 170 information processor 100 develops a total ordering of the input elements in accordance with the process defined in (2) and the ordered elements are stored in block 110. Control block 120 has access to the ordered symbols and to the relations list and based on the available information and the a priori known grammar, block 120 creates a guiding list which is stored in block 130. Control 120 also interacts with stack 140 and state transition matrix store 150. In operation, as described hereinafter in greater detail, control 120, in consultation with stack 140, state transition matrix in block 150, relations list in block 170 and the guiding list in block 130 determines whether information that is contained in the stack should be reduced or, alternatively, whether a particular type of element should be searched for in the ordered collection of elements found in block 110. When such an element is found, it is basically transferred from block 110 to stack 140. Whether a reduction is performed or a new element is searched for and selected, the result is that a new tuple of information is pushed into stack 140. The process repeats until, in the absence of errors (which happens when the grammar cannot be satisfied), the process terminates when the entire set of elements stored in block 110 is transferred out of block 110 and onto stack 140.

Figure 4:
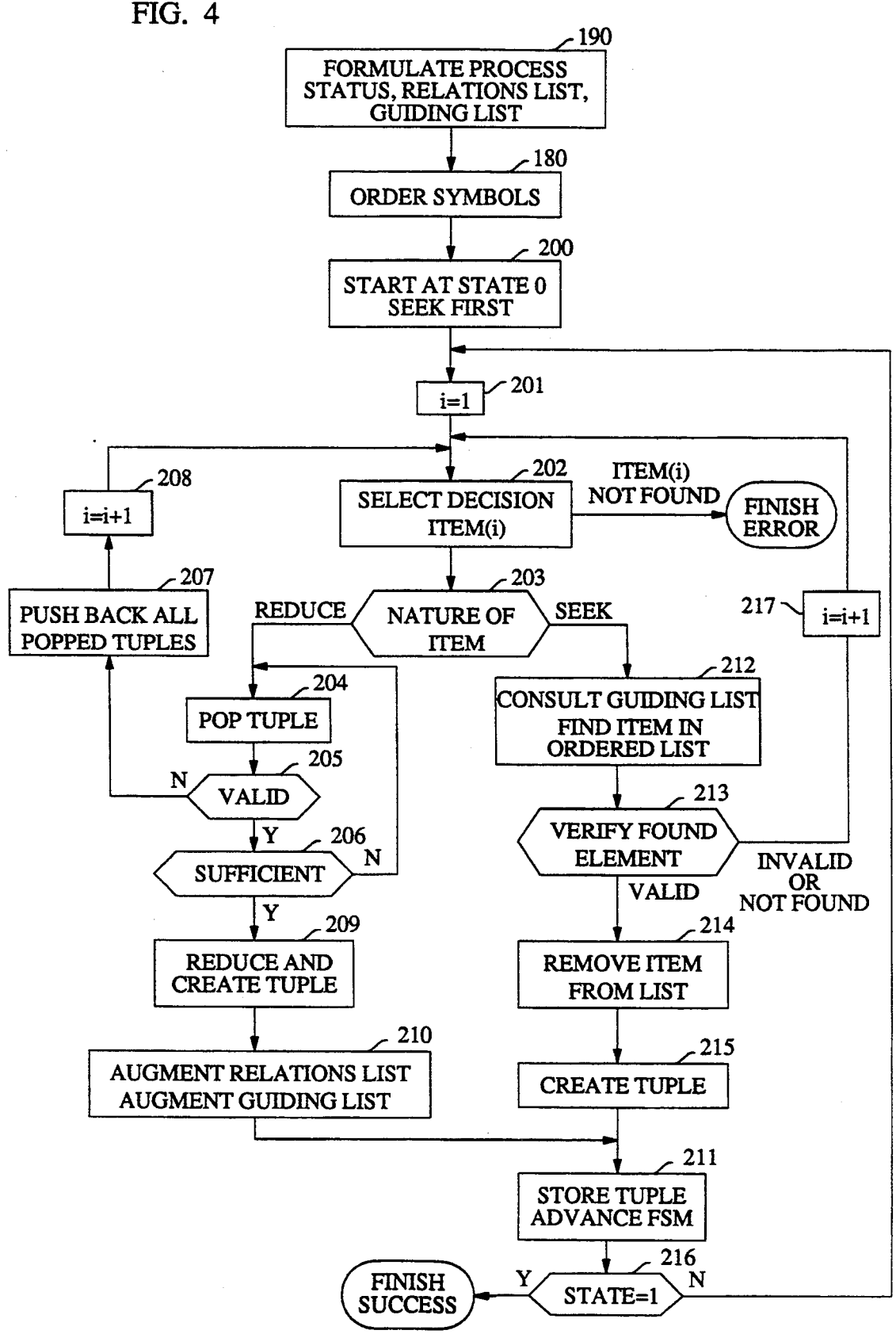
FIG. 4 is a flowchart describing the parsing process of this invention.

FIG. 4 presents a flow chart of the parsing process. It begins with block 190 where, based on the grammar, the states of the FSM are determined. Also in that block, the relationships list and the guiding list are formulated in their initial state. Thereafter, in block 180, the total order is established for the given set of input symbols in accordance with the described methodology.

The actual parsing starts at block 200 where the finite state machine (control block 120 in combination with blocks 140, 150, 160 and 170) is at state 0. The directive to place the finite state machine in state 0 is effected by the initial placing of the tuple "::0" in stack 140. It is the 0 in the third field of the tuple (the "::0"being the tuple that was most recently pushed onto the stack and, hence, at the top of the stack) that dictates the state of the FSM.

The production items block (160) is perused for all decision items in state 0 and, the "seek first" decision item is found. It, in effect, specifies a seek of the first entry in the ordered input of block 110—which is the leader element. In block 201 an index variable i is set to 1 and the parse proceeds to block 202. In block 202 a selection is made of the first decision item (i=1) in the current state, from among the other decision items in block 160 for that state. This may be a kernel item or an item that represents a reduction. Some states of the finite state machine may have a number of such items. If a state has M decision items and the value of i reaches M+1, block 202 declares an error. Otherwise, the parse continues to block 203 where the nature of the decision item is determined. If it is determined that the decision item calls for a reduction, the parse proceeds to block 204. A tuple is popped out of stack 140 and the parse advances to block 205 where the popped tuple is compared to what is expected by the selected decision item. If the popped tuple is valid, decision block 206 determines whether additional tuples need to be popped from the stack; and if that is the case, control returns to block 204. If a popped tuple is determined to be invalid in block 205, all of the popped tuples are pushed back onto stack 140 in block 207, the value of i is incremented by 1 in block 208, and control returns to block 202.

When block 206 determines that all of the necessary tuples have been popped, the parse proceeds to block 209 where the reduction is performed in accordance with the selected decision item. Block 209 also creates a new tuple in accordance with information derived from state transition matrix block 150. In block 210 the relations list of block 170 is augmented as well as the guiding list of block 130, and control passes to block 211. Block 211 stores the tuple created in block 209 and thereby advances the finite state machine to the next state. Following block 211, block 216 determines whether the finite state machine has reached state 1. If so, the process terminates. Otherwise, control returns to block 201.

When it is determined in block 203 that the decision item selected in block 202 is a seek item, guiding list 130 is consulted in block 212 and, based on information derived from the guiding list, the input elements in block 110 are searched in order. The first element that matches the requirements of the search, as determined by block 213, is deleted from block 110 by block 214. A tuple is created for the newly accepted element in block 215 in cooperation with information derived from state transition matrix block 150 and control then passes to block 211.

I claim:

1. A method carried out by a computer including a memory and a processing unit, for arranging a set of symbols in accordance with a grammar, which symbols are stored in said memory, said method comprising the steps of:
   the processing unit choosing a symbol from said set of symbols and forming with said symbol a current partial expression, and
   the processing unit iteratively executing, until all symbols stored in said memory are selected, the steps of
      searching the set of symbols according to a preselected order in the course of the step of searching, selecting the first symbol that meets a selectability criterion which is dependent on the current partial expression and the grammar, and
      associating the selected symbol with the current partial expression to form a new current partial expression.

2. The method of claim 1 wherein said step of associating comprises the steps of:
   ascertaining, based on said grammar, whether the symbol selected by said processing unit and associated in the steps of selecting and associating is to be combined with the current partial expression;
   combining the selected and associated symbol with the current partial expression to form a reduced current partial expression when called for by said step of ascertaining.

3. The method of claim 1 wherein the step of associating includes the step of deleting the selected symbol from the set of symbols and modifying the selectability criterion.

4. A method carried out by a computer that includes a memory and a processing unit, for arranging a set of symbols with one or more partial orders of the symbols, in accordance with the specification of a grammar, said grammar and said symbols being stored in said memory, and said method, which is carried out by said processing unit in concert with control information and data stored in stored in said memory, comprising the steps of:
   ordering the symbols in said set in accordance with preselected ordering rules to form an ordered set of symbols; selecting the first symbol in the ordered set as a current partial expression and placing the partial expression in a memory stack;
   determining characteristics of a selectable symbol based on the current partial expression and said grammar;
   searching said ordered set of symbols for the first selectable symbol in said ordered set and choosing said first selectable symbol;
   storing in said stack the symbol found by said step of searching; and
   returning to said step of determining until the last of the symbols in said ordered set of symbols is chosen.

5. The method of claim 4 wherein said step of storing comprises a step of combining the symbol found by said step of searching with the partial expression stored in said stack to form a reduced new current partial expression, when such combining is called for by said grammar.

6. A method implemented by a computer that includes memory and a processing unit for arranging a set of partially ordered symbols in accordance with the specification of a grammar where each symbol is classifiable by a type, the method being executed by the processing unit in concert with the memory and comprising the steps of:

- ordering the set of partially ordered symbols to form an ordered set of symbols;
- selecting a type of symbol that is acceptable for an expression in a stack data structure in the memory where acceptability is based on a given grammar and on a partial expression stored in the stack;
- determining based on said grammar whether the selected type is a "seek" type or a "reduce" type;
- when the selected type is a "seek" type,
  a) searching the ordered set, in order, for the first symbol in the ordered set that is characterized by the selected type;
  b) returning to the step of selecting to select another type when the step of searching fails;
  c) removing from the ordered set the symbol found in the step of searching when the step of failing succeeds; and
  d) installing the symbol found in the step of searching in the stack;
- when the selected type is a "reduce" type,
  a) determining whether a reduction is possible for the partial expression in the stack;
  b) returning to the step of selecting to select another type when the step of determining whether a reduction step is possible concludes that a reduction is not possible;
  c) reducing the expression in the stack; and returning to said step of selecting a type.

* * * * *